(12) United States Patent
Johnson et al.

(10) Patent No.: US 12,143,552 B1
(45) Date of Patent: Nov. 12, 2024

(54) PRINT SCALING CORRECTION MECHANISM

(71) Applicants: Scott R. Johnson, Boulder, CO (US); Qingzhao Zhu, Boulder, CO (US)

(72) Inventors: Scott R. Johnson, Boulder, CO (US); Qingzhao Zhu, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/507,407

(22) Filed: Nov. 13, 2023

(51) Int. Cl.
*G06K 15/02* (2006.01)
*H04N 1/393* (2006.01)

(52) U.S. Cl.
CPC ............................... *H04N 1/3935* (2013.01)

(58) Field of Classification Search
None
See application file for complete search history.

(56) References Cited

U.S. PATENT DOCUMENTS

| | | | |
|---|---|---|---|
| 8,102,404 B2 | 1/2012 | Schweid | |
| 8,189,914 B2 | 5/2012 | Hong | |
| 8,279,473 B2 | 10/2012 | Miyata | |
| 8,292,398 B2 | 10/2012 | Mizes et al. | |
| 8,662,625 B2 | 3/2014 | Donaldson | |
| 8,721,030 B2 | 5/2014 | Chen et al. | |
| 8,767,250 B2 * | 7/2014 | Kaima | G06K 15/128 358/1.2 |
| 8,773,483 B2 | 7/2014 | Ando et al. | |
| 9,126,425 B2 | 9/2015 | MacClary et al. | |
| 9,241,089 B2 * | 1/2016 | Kaima | H04N 1/3935 |
| 9,254,682 B2 | 2/2016 | Duke et al. | |
| 9,278,555 B2 | 3/2016 | Toriihara et al. | |
| 9,290,012 B2 | 3/2016 | Shishido et al. | |
| 9,346,285 B2 | 5/2016 | Rawlings et al. | |
| 9,375,962 B1 | 6/2016 | Donaldson et al. | |
| 9,688,084 B2 | 6/2017 | Suda et al. | |
| 9,733,602 B2 | 8/2017 | Oki | |
| 9,844,961 B1 | 12/2017 | Mantell et al. | |
| 10,201,990 B2 | 2/2019 | Fernandez et al. | |
| 10,284,747 B2 | 5/2019 | Sakata | |

(Continued)

FOREIGN PATENT DOCUMENTS

| | | |
|---|---|---|
| EP | 2942672 A1 | 11/2015 |
| JP | 5042584 | 10/2012 |

(Continued)

*Primary Examiner* — Dung D Tran
(74) *Attorney, Agent, or Firm* — Jaffery Watson Hamilton & DeSanctis LLP

(57) ABSTRACT

A system is disclosed. The system includes at least one physical memory device to store scaling correction logic and one or more processors coupled with the at least one physical memory device to execute the scaling correction logic to receive first measured print image data associated with printed test marks on a first print medium from a first side of a first page image of a print job and second measured print image data associated with printed test marks on the first print medium from a second side of the first page image, generate a first side scaling factor based on the first measured print image data and a second side scaling factor based on the second measured print image data, generate a first page scaling factor including the first side scaling factor and the second side scaling factor and generate a scaling factor correction based on the page scaling factor.

25 Claims, 14 Drawing Sheets

(56) References Cited

U.S. PATENT DOCUMENTS

| | | |
|---|---|---|
| 10,399,372 B2 | 9/2019 | Kanai |
| 10,440,195 B2 | 10/2019 | Lebrato et al. |
| 10,536,609 B2 | 1/2020 | Schramek et al. |
| 10,705,472 B2 | 7/2020 | Saito et al. |
| 10,725,418 B2 | 7/2020 | Lee et al. |
| 10,828,911 B2 | 11/2020 | Havive et al. |
| 11,113,010 B2 | 9/2021 | Domingo et al. |
| 11,128,778 B2 | 9/2021 | Van Breugel et al. |
| 11,457,113 B2 | 9/2022 | Tomii |
| 2010/0329756 A1 | 12/2010 | Mizes |
| 2018/0205834 A1* | 7/2018 | Maeda ............... G03G 15/5058 |
| 2020/0371463 A1 | 11/2020 | Kuo et al. |
| 2021/0185181 A1* | 6/2021 | Tomii ................... G06F 3/1285 |
| 2021/0383179 A1* | 12/2021 | Velner ................... H04N 1/401 |
| 2022/0308800 A1 | 9/2022 | Takahashi et al. |

FOREIGN PATENT DOCUMENTS

| | | |
|---|---|---|
| JP | 2016055582 | 4/2016 |
| JP | 6074945 | 2/2017 |
| JP | 2017132147 | 8/2017 |
| JP | 2015161789 | 10/2017 |
| JP | 6223392 | 11/2017 |
| JP | 6225688 | 11/2017 |
| JP | 6372251 | 8/2018 |
| JP | 2018176532 | 11/2018 |
| JP | 2019008242 | 1/2019 |
| JP | 2019111706 | 7/2019 |
| JP | 6652328 | 2/2020 |
| JP | 6690561 | 4/2020 |
| JP | 6701586 | 5/2020 |
| JP | 2020131598 | 8/2020 |
| JP | 2020189419 | 11/2020 |
| JP | 2020189710 | 11/2020 |
| JP | 2021006483 | 1/2021 |
| JP | 6834351 | 2/2021 |
| JP | 2021087195 | 6/2021 |
| JP | 2021148849 | 9/2021 |
| JP | 2021165015 | 10/2021 |
| JP | 6972974 | 11/2021 |
| JP | 7031782 B2 | 2/2022 |
| JP | 7027803 | 3/2022 |
| JP | 7031782 | 3/2022 |
| JP | 2022088701 | 6/2022 |
| JP | 2022110889 | 7/2022 |
| JP | 2023030525 | 3/2023 |
| JP | 2023124397 | 9/2023 |
| JP | 2021097291 | 1/2024 |

* cited by examiner

Realtime Correction

Settings for Print Quality Correction

350

☑ Compensate for jetting defects
Jetout

Density
☑ Compensate for density calibration

Uniformity
☑ Compensate for uniformity

Alignment
☑ Compensate for color alignment

Front and back alignment
☑ Compensate for front and back alignment

Insert Print Quality Check

Number of pages before printing
[ 4 ]

Number of pages during printing
[ 4 ]

Interval while printing
[ 500 ]

Number of pages after printing
[ 4 ]

Figure 7A

PRINT SCALING CORRECTION MECHANISM

FIELD OF THE INVENTION

The invention relates to the field of printing systems, and in particular, to image processing in a printing system.

BACKGROUND

Entities with substantial printing demands typically implement a high-speed production printer for volume printing (e.g., one hundred pages per minute or more). Production printers may include continuous-forms printers that print on a long web of print medium (e.g., paper) stored on a large roll. A production printer typically includes a localized print controller that controls the overall operation of the printing system, and one or more print engines that include one or more printhead assemblies, where each printhead assembly includes an array of printheads. Each print engine may be three meters or more in length. Each printhead comprises many nozzles (e.g., inkjet nozzles) for the ejection of ink or any marking material suitable for printing on a print medium.

SUMMARY

In one embodiment, a system includes at least one physical memory device to store scaling correction logic and one or more processors coupled with the at least one physical memory device to execute the scaling correction logic to receive first measured print image data associated with printed test marks on a first print medium from a first side of a first page image of a print job and second measured print image data associated with printed test marks on the first print medium from a second side of the first page image, generate a first side scaling factor based on the first measured print image data and a second side scaling factor based on the second measured print image data, generate a first page scaling factor including the first side scaling factor and the second side scaling factor and generate a scaling factor correction based on the page scaling factor.

BRIEF DESCRIPTION OF THE DRAWINGS

A better understanding of the present invention can be obtained from the following detailed description in conjunction with the following drawings, in which:

FIGS. 7A&7B illustrate embodiments of a graphical user interface;

DETAILED DESCRIPTION

The implementation of multiple print engines in a high-speed production printer may often lead to problems with paper shrinkage. For example, a print medium (or paper) begins at room temperature with some amount of moisture. However, a significant amount of shrinkage to the paper may occur after printing and drying a first side of paper at a first print engine. Further, the paper is cooled before the second side is printed and dried at a second print engine, where a different amount of shrinkage occurs. The different amounts of shrinkage for each side often results in different printed image sizes on the front and back side of the paper with the same print instructions for both sides of the paper.

Conventional methods to correct for such shrinkage involves manually inspecting printed pages to estimate how the front and back sides line up in order to determine how to scale the two sides. Subsequently, the appropriate scaling is performed to compensate for the shrinkage amounts (e.g., by either decreasing the side two scale or increasing the side one scale until they until they matched). Other parameters within the print system such as ink coverage (e.g., the amount of ink applied to a page are), dryer operating points (e.g., temperature or airflow), and paper moisture content affect the amount of shrinkage. Moreover, this scaling correction process must be performed for each paper type implemented at the printer due to the varying paper type physical characteristics that affect paper shrinkage.

According to one embodiment, a mechanism to automatically perform scaling correction to compensate for paper shrinkage is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
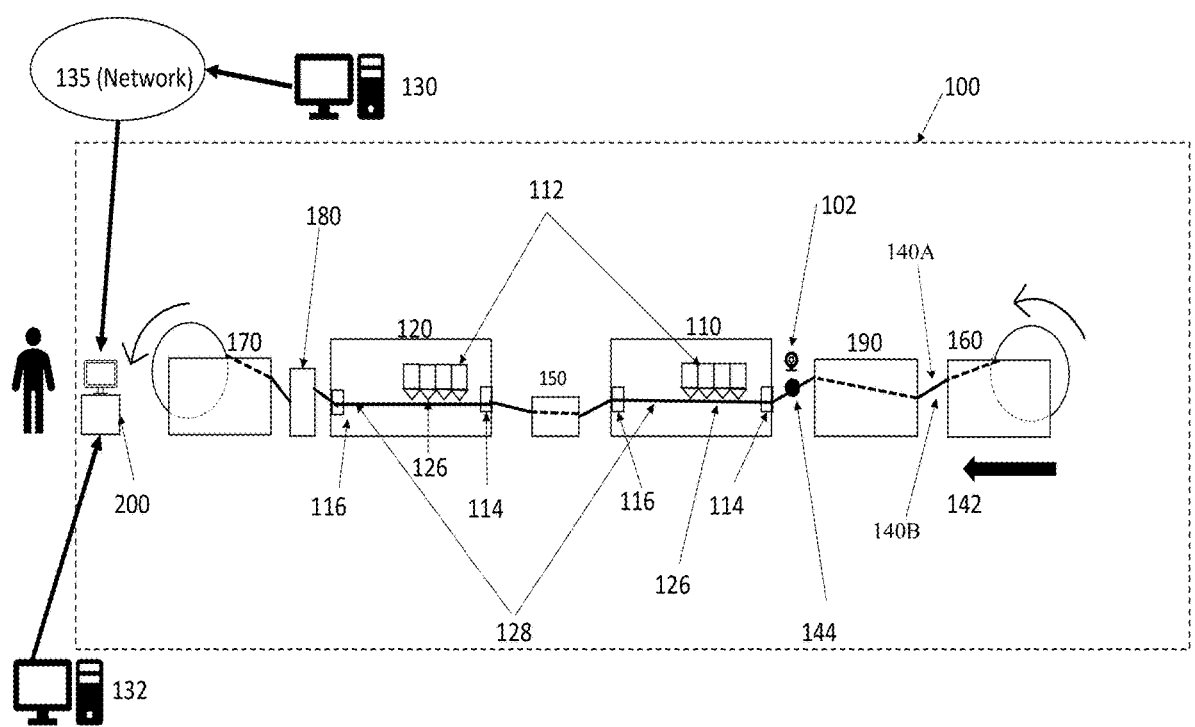
FIG. 1 is a block diagram of one embodiment of a printing system.

FIG. 1 is a block diagram illustrating one embodiment of a printing system 100. As shown in FIG. 1, printing system 100 comprises a tandem duplex continuous-forms printer 100 including a first print engine 110, a second print engine 120, and a print controller 200. The first print engine 110 and second print engine 120 each have respective entrance 114, exit 116, one or more printheads 112, etc. Paper supply unit 160 supplies paper 140 (e.g., a continuous form print medium also known as a web) to print system and is typically a paper roll unwinder that unwinds the paper from a large roll. Paper 140 exits paper supply 160 and is fed into the entrance of splicing unit 190. When the paper roll in paper supply 160 is near an end, a splicing unit 190 responds by applying a splice between a section of paper from a first roll that is nearly empty and a second roll that is full. The second paper roll may be part of paper supply 160 or splicing unit 190.

Further, paper supply 160 and/or splicing unit 190 may contain web buffers (e.g., web festoons) that store lengths of paper 140 (e.g., web) having sides 140A and 140B. One use of a web buffer is to increase the time from detection of a splice 144 to the time that the splice 144 reaches the entrance 114 of first print engine 120 by storing a known web length amount and locating a sensor 102 to detect the splice upstream of the web buffer. The stored web length amount may be constant and fixed or otherwise identified at the time of the detection of a splice 144 by the sensor 102.

In other embodiments, the functions of paper supply 160 and splicing unit 190 may be combined into one device. Paper 140 exits splicing unit 190 and is fed into the entrance 114 of print engine and advances through the print engine 110 along the paper path 128, past printheads 112 and out of the exit 116. Other components of the print engines 110 and 120, such as paper rollers, paper guides, paper drive mechanisms, paper tensioners and dryers, are not shown for brevity. Besides a continuous form rolled format, paper 140 may be a folded type of continuous paper that may alternatively be supplied to the first print engine 110.

Paper 140 may include one or more splices 144 fixed in one or more sections of the paper 140. Paper 140 generally proceeds in the paper processing direction 142 (e.g., x direction) while printing. Paper path 128 is the physical path the paper 140, in a taut (e.g., tight) state, takes as it progresses starting at paper supply unit 160 and finishing at post-processing device 170 and includes the path within all the devices in between. Printheads 112 include one or more pel forming elements that directly or indirectly (e.g., by transfer of marking material through an intermediary) forms the representation of picture elements (pels) on the paper 140 (e.g., the print medium) with marking material applied to the paper 140.

In an ink jet printer, a pel forming element is a tangible device that ejects the ink onto paper (e.g., an ink jet nozzle) and, in an electro-photographic (EP) printer the pel forming element may be a tangible device that determines the location of toner particles printed on the print medium (e.g., an EP exposure LED or an EP exposure laser). Further, the pel forming elements may be assigned to one of one or more color planes that correspond to types of marking materials (e.g., Cyan, Magenta, Yellow, and black (CMYK)). The space between the nozzle surface of printhead 112 and surface of paper 140 (or the surface of splice 144) that faces away from the nozzle surface of printhead 112 is printhead gap 126.

The paper 140 is fed through a paper inverting unit 150 at the output of the first printer so that the second printer prints on the reverse side of the first printer's output in order to realize tandem duplex printing. The functions of the respective units of the entrance 114, exit 116, one or more printheads 112, etc. in the second print engine 120 are the same as those of the first print engine 110. The print controller 200 receives print job data from upper-level computers 130, 132, etc. . . . and after carrying out a drawing process, outputs image data to the first print engine 110 and the second print engine 120.

The upper level computer 130 is connected to the print controller 200 via a network 135. Network 135 may be LAN, WAN or cloud. The upper-level computer 132 is connected to the print controller 200 via a local interface. Physically, the local interface is realized as a printer local I/F cable. In the tandem duplex print mode, the paper inverting unit 150 inverts the printing surfaces of paper 140, on a first surface of which printing has been performed by the first print engine 110, and outputs the paper 140 from the exit 116 to the second print engine 120. In the tandem single-side print mode, the paper 140 is passed through the paper inverting unit 150 without being inverted. The second print engine 120 receives the paper 140 that has been conveyed through the paper inverting unit 150 at entrance 114 in second print engine 120. The paper path mechanisms (not shown) advance the paper 140 along the paper path 128 to the printing processes of the printhead 112, etc., of the second print engine 120.

Thus, by the use of the paper inverting unit 150, printing by the first printer engine 110 is carried out first and then printing by the second print engine 120 is carried out to realize tandem duplex printing. The paper 140 that has been printed on by the second print engine 120 is output through the exit 116 to print verification system (PVS) 180 or a post-processing device 170 in accordance with the paper loading performed by an operator.

In one embodiment, PVS 180 is implemented to capture print images of the sides of the print substrate (e.g., paper) and determine print quality defects on the substrate. Print quality defects may be defects from faulty print marking on the substrate and/or physical defects in the substrate (e.g., impurities, spots, stains, flutter, cockle, wrinkles and/or z-direction defects). In one embodiment, PVS 180 may transmit captured print images and/or report results of any detected defects to print controller 200 for further processing.

Post-processing device 170 may be a paper roll re-winder or a sheet cutter with sheet stacker. The output to a paper roll re-winder type post-processing device 170 is especially effective when a paper roll unwinder type paper supply unit 160 is used as the paper supply for the first print engine 110.

In the tandem duplex print mode, after printing on the front surface is performed by the first print engine 110, the paper 140 is inverted by the paper inverting unit 150 and then supplied to the second print engine 120. The second print engine 120 performs printing on the back surface of the inverted paper 140. In other words, the second print engine 120 performs printing on the opposite side of paper 140 that first print engine 110 printed. In the tandem single-side print mode, after printing on the front surface is performed by the first print engine 110, the paper inverting unit 150 supplies the paper 140 as it is without inversion to the second print engine 120. In print system 100, paper 140 may be allowed to stay not inverted by either bypassing paper inverter unit 150 or removing paper inverter unit 150 from print system 100. Thus, as with the first print engine 110, the second print engine 120 also performs printing on the front surface of the paper 140.

Figure 2A:
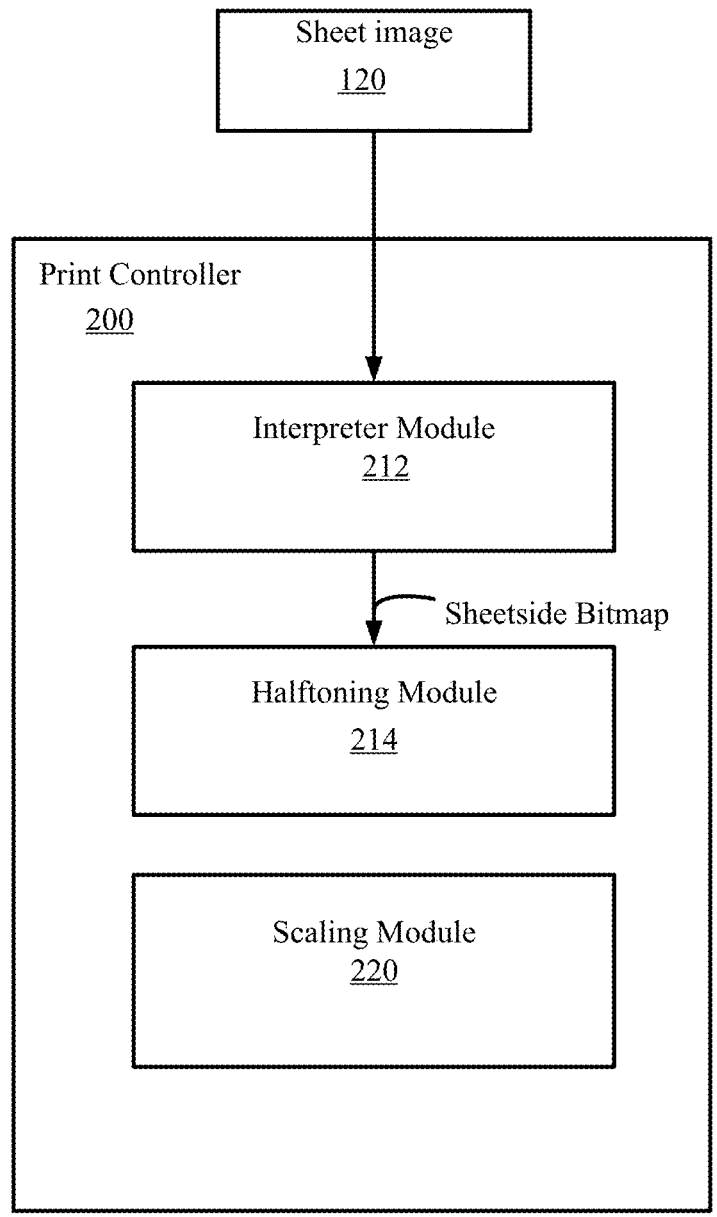
FIGS. 2A-2C are block diagrams illustrating embodiments of a print controller.
Figure 2B:
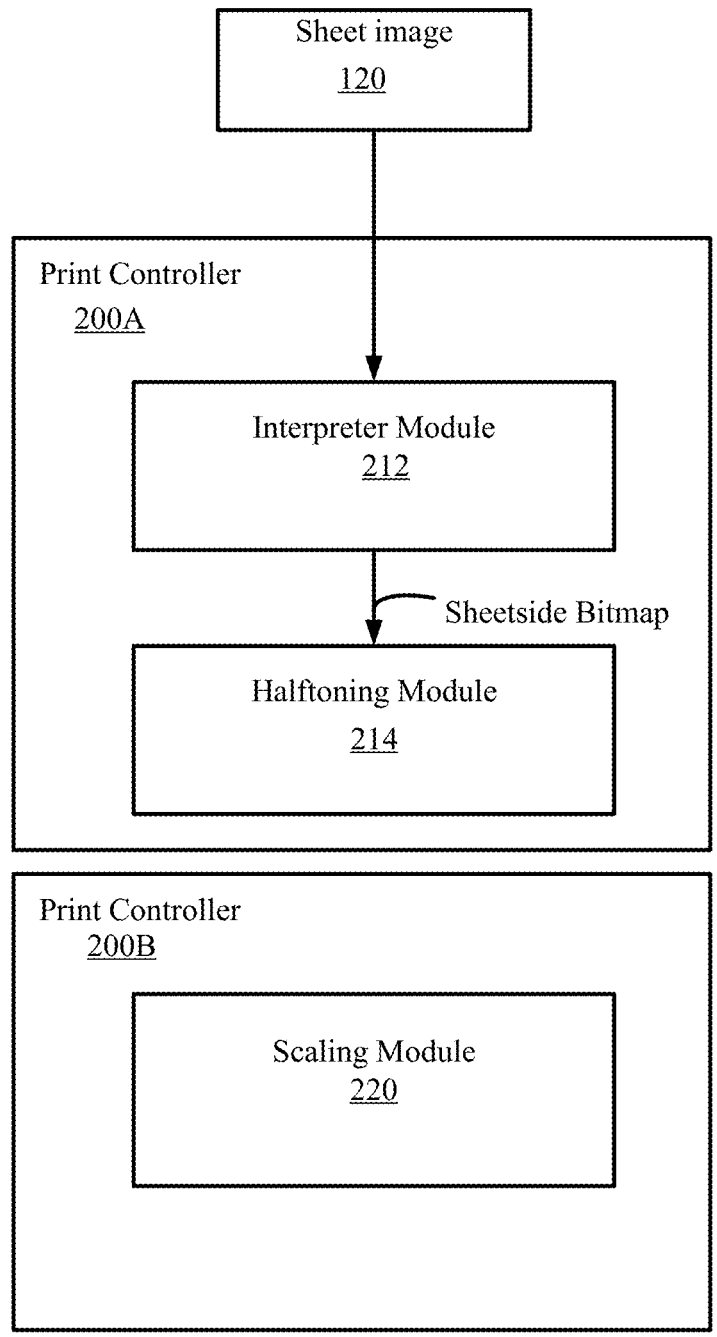

FIGS. 2A&2B are block diagrams illustrating embodiments of a print controller 200. As shown in FIG. 2A, print controller 200 (e.g., DFE or digital front end), in its generalized form, includes interpreter module 212, halftoning module 214 and scaling module 220. FIG. 2B illustrates an alternative embodiment having print controllers 200A&200B. In this embodiment, print controller 200A includes interpreter module 212 and halftoning module 214, while print controller 200B includes scaling module 220. Print controllers 200A and 200B may be implemented in the same printing system 100 (as shown) or may be implemented separately.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the set of pixels for the image. In one embodiment, interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location.

As mentioned above, a problem with different amounts of shrinkage between the front and back sides of paper 140 while operating in the duplex print mode may lead to undesirable print image size differences between the two sides of paper 140. According to one embodiment, scaling module 220 is implemented to facilitate the automatic scaling to compensate for such shrinkage.

Figure 3:
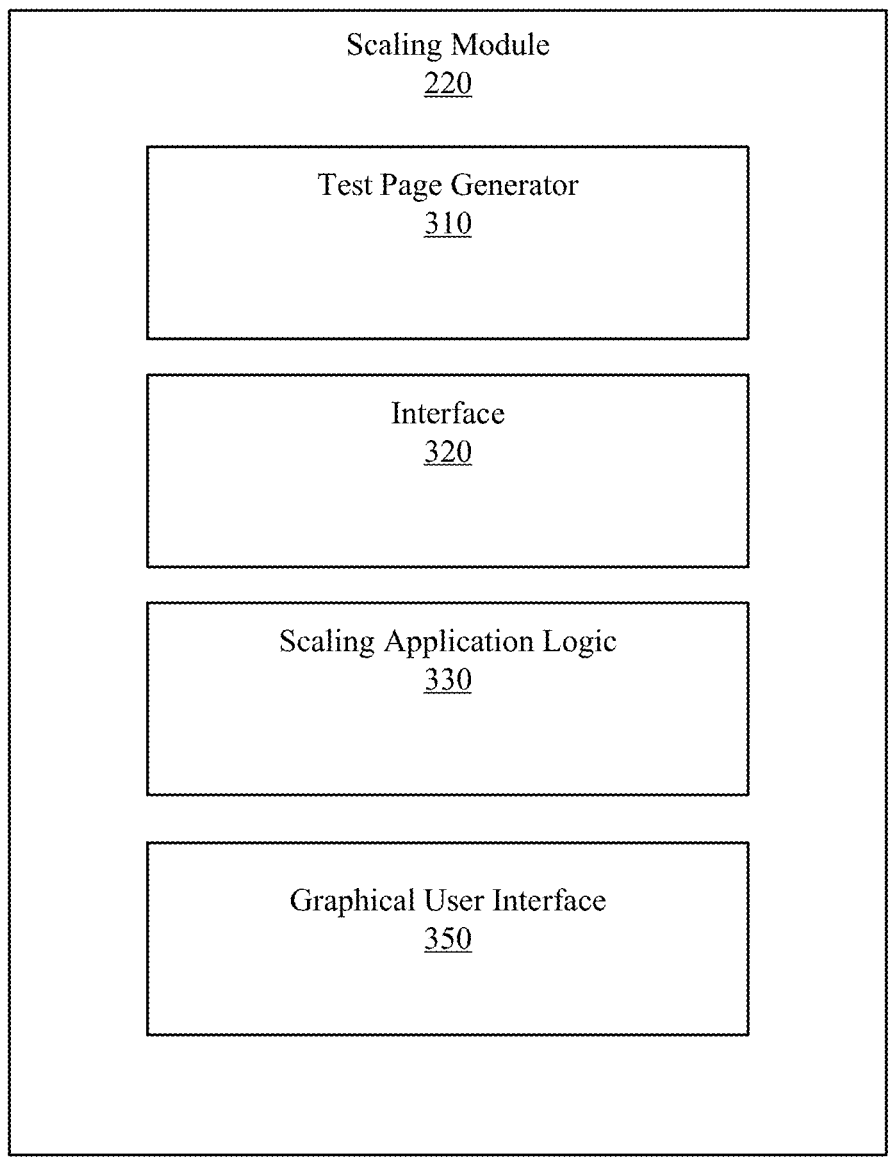
FIG. 3 illustrates one embodiment of a scaling module.
Figure 4A:
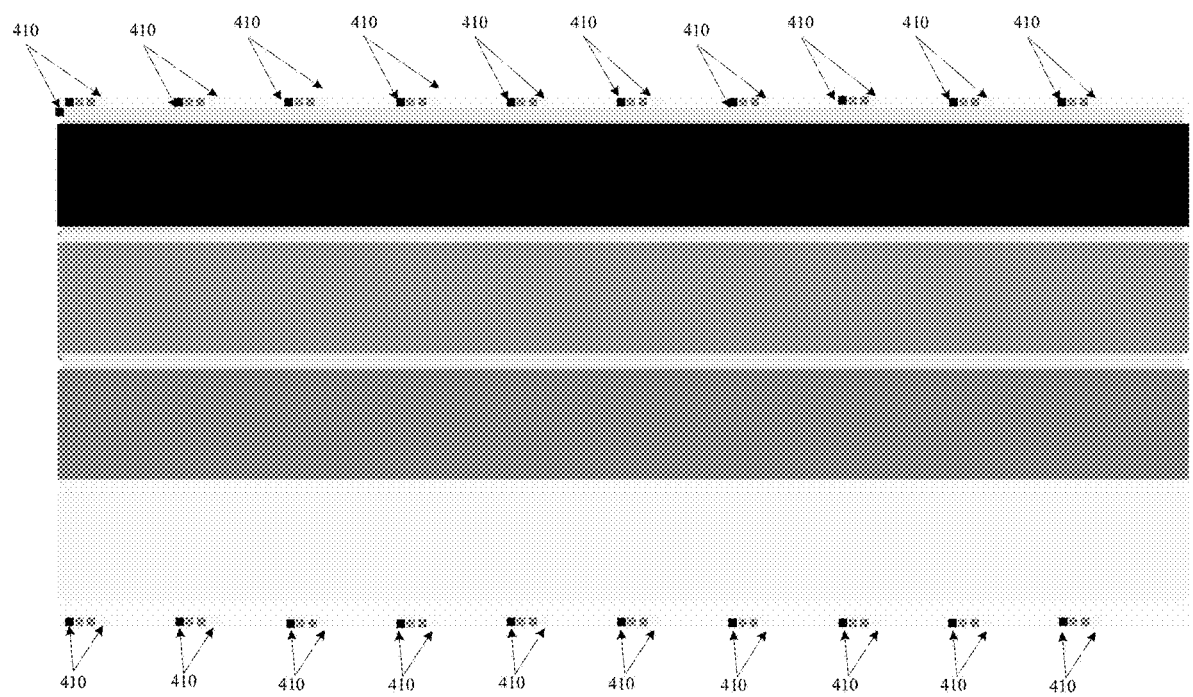
FIGS. 4A & 4B illustrate embodiments of finder marks.
Figure 4B:
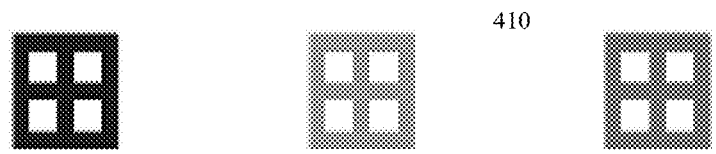

FIG. 3 illustrates one embodiment of a scaling module 220 including test page generator 310, interface 320 and scaling application logic 330. Test page generator 310 generates quality test pages having patterns that facilitate scaling measurements at PVS 180. In one embodiment, a quality test page includes finder marks (or test marks) that extend across paper 140 at known locations. FIG. 4A illustrates one embodiment of a test page having test marks 410, while FIG. 4B illustrates one embodiment of a close up view test marks 410.

In a further embodiment, the test marks are printed by print engines 110 and 120 on each printable side of paper 140 according to test mark print instructions. In this embodiment, test marks for the two sides are not instructed to be placed overlaying each other and this yield the technical benefit of reducing ink bleeding through to the other paper side, which may interfere with scaling measurements. In yet a further embodiment, a quality test page may comprise separate test pages used during an offline printer calibration. In another embodiment, the test marks are printed without applying the scaling factor correction with the resulting benefit that other processes that are dependent on the same text mark are not impacted by scaling the test marks. However, in an alternative embodiment, test pages may be incorporated into a production print page during the processing of an on-line print job with a technical benefit of not using separate test pages that would otherwise be discarded after printing. In this embodiment, each test page print instructions are included in print instructions associated with the print job.

Referring back to FIG. 3, interface 320 comprises an application programming interface (API) that facilitates communication with scaling correction logic at PVS 180. According to one embodiment, interface 320 is configured to receive update messages from PVS 180. In such an embodiment, an update message includes scaling factor corrections (or updated scaling factor corrections) generated at PVS 180. In other embodiments, the update message may include a scaling factor error message, as will be discussed in more detail below. Scaling application logic 330 applies the scaling factor corrections to print instructions associated with print jobs that are being printed. In one embodiment, a scaling factor correction is applied to the processing of print instructions at interpreter 212.

Figure 5:
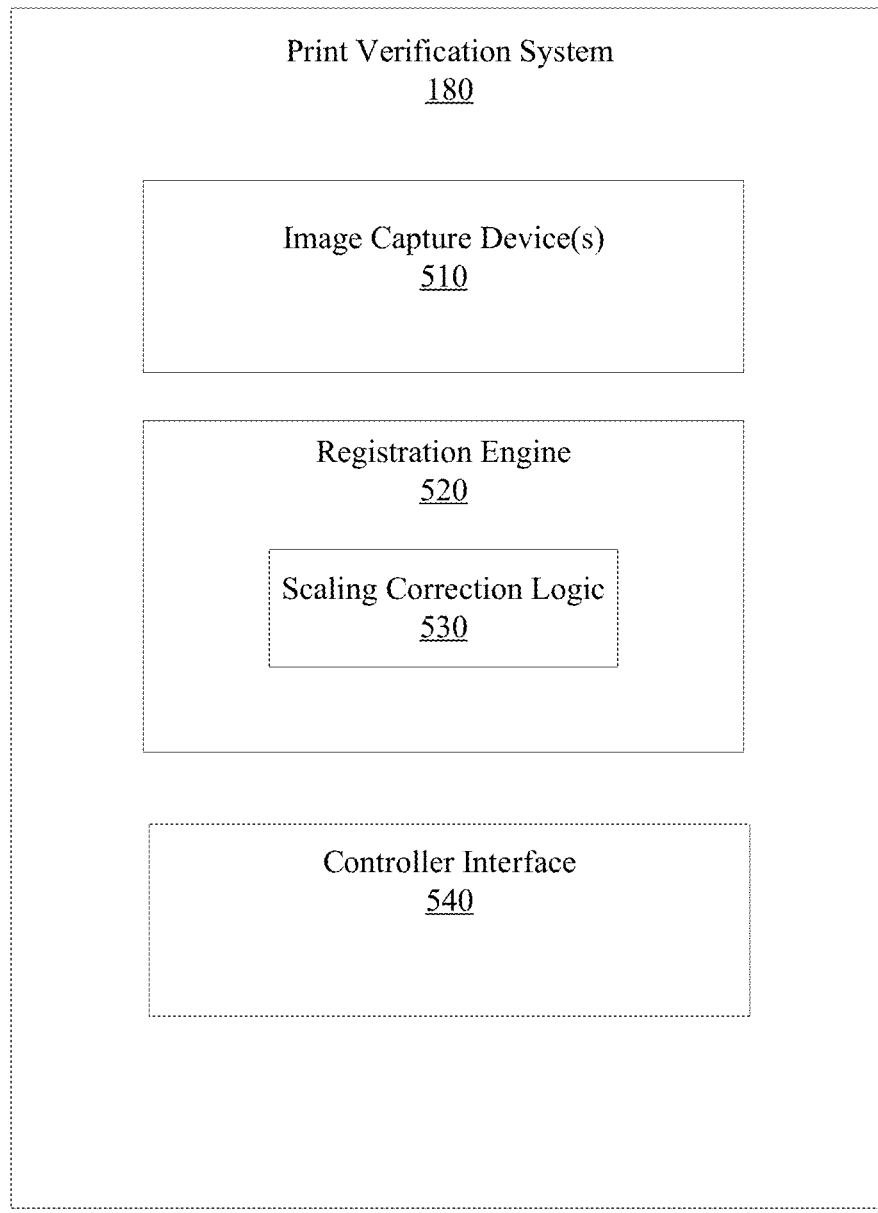
FIG. 5 illustrates one embodiment of a print verification system.

Once printed on paper 140, test pages are subsequently received at PVS 180 for quality inspection. FIG. 5 illustrates one embodiment of PVS 180, including image capture device 510, registration engine 520 and controller interface 540. In one embodiment, image capture device 510 includes one or more cameras. However, in other embodiments, image capture device 510 may include different types of image capture devices.

Image capture devices 510 may provide measurements (e.g., pixel reflectance, intensity, locations etc.) of the images for each of one or more color bands. In such embodiments, one or more image capture devices 510 capture (or scan) images of the print medium after the bitmap print image data (or bitmap data) has been applied to the print medium using the marking material. The image capture device 510 may transmit the resulting print image data corresponding to one or more color bands (e.g., red, green, blue etc.) and/or a greyscale band. In one embodiment, image capture device 510 captures images of the test marks printed on test pages and generates measured print image data associated with each side of a test page. In a further embodiment, the measured print image data comprises pixel locations of the test marks.

Registration engine 520 receives the resulting measured print image data (e.g., print image) and registers the measured print image data with the expected print image data (e.g., bitmap print image data, bitmap image or other test mark source print instructions that identify the instructed location and/or dimensions of the test marks on the test page). Registration engine 520 may access expected print image data by receiving it or retrieving from stored memory. According to one embodiment, a registration process may be implemented by performing color transformation, rotation, skew transformation, translation, and/or scaling operations on the print medium images and/or the bitmap images to obtain a matched alignment between the test marks in the measured print image data and test marks in the expected print image data. Accordingly, registration engine may include scaling correction logic 530 to perform scaling correction based on test marks included in various test pages. Controller interface 540 comprises an API configured to interface with interface 320 at print controller 200. In one embodiment, controller interface 540 transmits the update messages including scaling factor corrections to interface 320.

Figure 6:
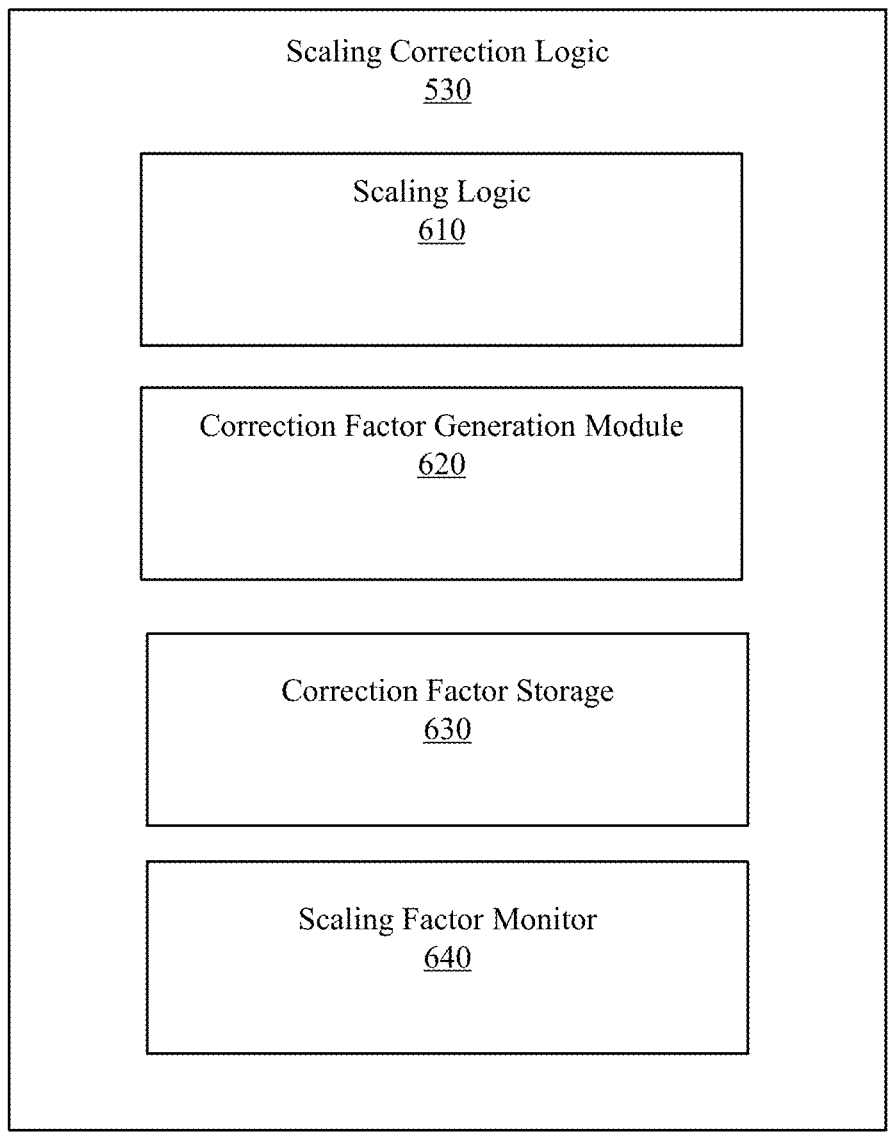
FIG. 6 illustrates one embodiment of a scaling correction logic.

FIG. 6 illustrates one embodiment of scaling correction logic 530. According to one embodiment, scaling correction logic 530 receives first measured print image data associated with printed test marks on paper 140 from a first side of a print image of a print job and second measured print image data associated with printed test marks from a second side of the print image, generates a first side scaling factor based on the first measured print image data and the expected print image data and a second side scaling factor based on the second measured print image data and the expected print image data, generates a first page scaling factor including the first side scaling factor and the second side scaling factor and generates a scaling factor correction based on the page scaling factor. As used herein, a side scaling factor represents an amount of scaling for one or more dimensions for a single print medium side, a page scaling factor represents a side scaling factor each side of the print medium and a scaling factor correction represents an adjustment to match the format of print instructions. For example, if the print instructions have a command for scaling, page scaling factor is adjusted to be compatible with a print instruction command. This may include expressions of percent, relative amount, absolute amount and converted dimensional units, etc.

As shown in FIG. 6, scaling correction logic 530 includes scaling logic 610, correction factor generation module 620, correction factor database 630 and scaling factor monitor 640. Side scaling logic 610 generates a side scaling factor by comparing dimensions. The side scaling factor may be determined for one or more test mark dimensions. For example, test mark dimensions may include a first dimension component and a second dimension component (e.g., process direction x and cross-process direction y dimension which are orthogonal coordinate dimensions on the printable surfaces of the printed page) from measured print image data and from an expected print image data (e.g., data that includes the dimensions and/or location of expected test markings). In one embodiment, the comparison is done for each side of the print medium (e.g., dimensions from a first side measured print image are compared to corresponding dimensions from a first side expected print image, etc.). Expected print image data may be included in print instructions (e.g., received or retrieved from stored memory) associated with the print job. Scaling logic 610 may determine measured dimensions from the measured print image data (e.g., by counting pixels that comprise identified test marks).

According to one embodiment, generating a side scaling factor for each side comprises averaging measured dimensions of two or more test marks. A resulting technical benefit from this averaging is that the impact of spurious measurement data is minimized. In a further embodiment, an affine matrix (e.g., a two dimensional affine transformation) is used to determine the scaling factors for each side (e.g., by determining coefficients of the affine matrix). As used herein, an affine is a mathematical method to transform the measured test marks locations to the expected test mark locations. By using the parameters in an affine matrix, the scaling factor, rotation, translation can be determined. However, this feature uses the scaling factor result in this case. A resulting technical benefit for applying the affine matrix is that the scaling factor is determined with less computational burden than other methods.

According to one embodiment, scaling logic 610 generates a page scaling factor, which comprises the side scaling factor generated for each page side. Correction factor generation module 620 is implemented to generate a scaling factor correction that is to be transmitted to scaling application logic 330 at print controller 200 (e.g., via interfaces 540 and 320) to be applied to subsequent print jobs or pages of the current print job. The scaling factor correction may include correction for one or more dimensions.

In one embodiment, the scaling factor correction is stored in correction factor storage 630. In such an embodiment, the scaling factor correction is stored according to a medium identifier (e.g., medium metadata such as medium type or medium name) associated with a print medium. In a further embodiment, the scaling factor correction may be stored with other print processing parameters specific to the print medium identifier. Accordingly, multiple print medium print processing parameter sets may be stored with other print processing parameters specific to the print medium identifier. Subsequently, stored data may be retrieved (e.g., using the medium identifier) and applied during printing of later print jobs that use the same print medium; thus, yielding a technical benefit of avoiding another cycle of test page measurements. For example, the scaling correction logic 530 may receive a notification of a second print job to be printed on a second print medium, retrieve a second scaling factor correction based on a second print medium identifier (e.g., the second print medium identifier included with the second print job), and apply the second scaling factor correction to print instructions associated with the second print job.

According to one embodiment, an updated scaling factor correction may be generated based on an average of multiple prior scaling factor correction amounts. For example, a scaling factor correction generated based on scaling processing of a first test page and a scaling factor correction generated based on scaling processing of a second test page is averaged to generate the updated scaling factor correction. A resulting technical benefit from the averaging is that the updated scaling factor correction does not change as abruptly from the prior scaling factor correction amount and the differences in printed output produced with the updated scaling factor are less noticeable to the human observer.

According to another embodiment, the scaling correction logic 530 may update the scaling factor correction based receive third measured print image data associated with printed test marks on the print medium from a first side of a second page image of the print job and fourth measured print image data associated with printed test marks on the print medium from a second side of the second page image, generate a third side scaling factor based on the third measured print image data and a fourth side scaling factor based on the fourth measured print image data, and generate a second page scaling factor based on the third side scaling factor and the fourth side scaling factor; and generate an updated scaling factor correction based on the second page scaling factor.

Scaling factor monitor 650 monitors the scaling factors during production printing to determine whether a difference between two corresponding generated scaling factors (e.g., side scaling factors, page scaling factors and/or scaling factor corrections) generated at different times exceeds a predetermine threshold. In one embodiment, a scaling factor error message is generated upon a determination that the difference between different scaling factors exceeds the threshold. In a further embodiment, the scaling factor error message is included in an update message transmitted to scaling module 220 and displayed in graphical user interface (GUI) 350 (FIG. 3) as an operator alert. In yet further embodiments, scaling application logic 330, upon receiving the scaling factor error message, may generate a trigger that stops printer 100 and/or initiates a calculation of new scaling values. A resulting technical benefit for the determining a scaling factor error is that the scaling correction logic 530 may then initiate an alert message to the operator to take a recovery action and/or initiate a recovery action in response to the scaling factor error and thus minimize the amount of printed output with the scaling issue.

Figure 7B:
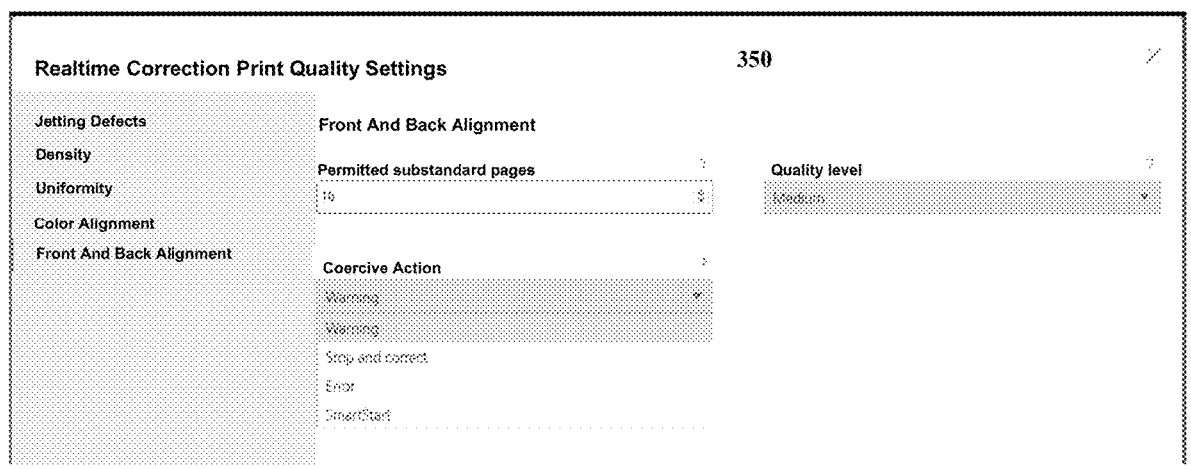

GUI 350 may also be implemented to enable operator selection for providing real time correction options, including a front and back alignment option. For example, a user may choose compensating for front and back alignment to be used in conjunction with inserted "Quality Check" pages at specified intervals wherein the test marks (e.g., scaling test marks) are included in the printed "Quality Check" pages along with other quality test marks (e.g., uniformity marks, density marks and/or alignment marks) with a technical benefit of reducing the number of separate test pages that would otherwise be needed if the scaling marks were not located on the same pages as the other quality marks. FIGS. 7A&7B illustrate embodiments of a GUI 350 including various front and back alignment options, which comprises the scaling operations.

Figure 2C:
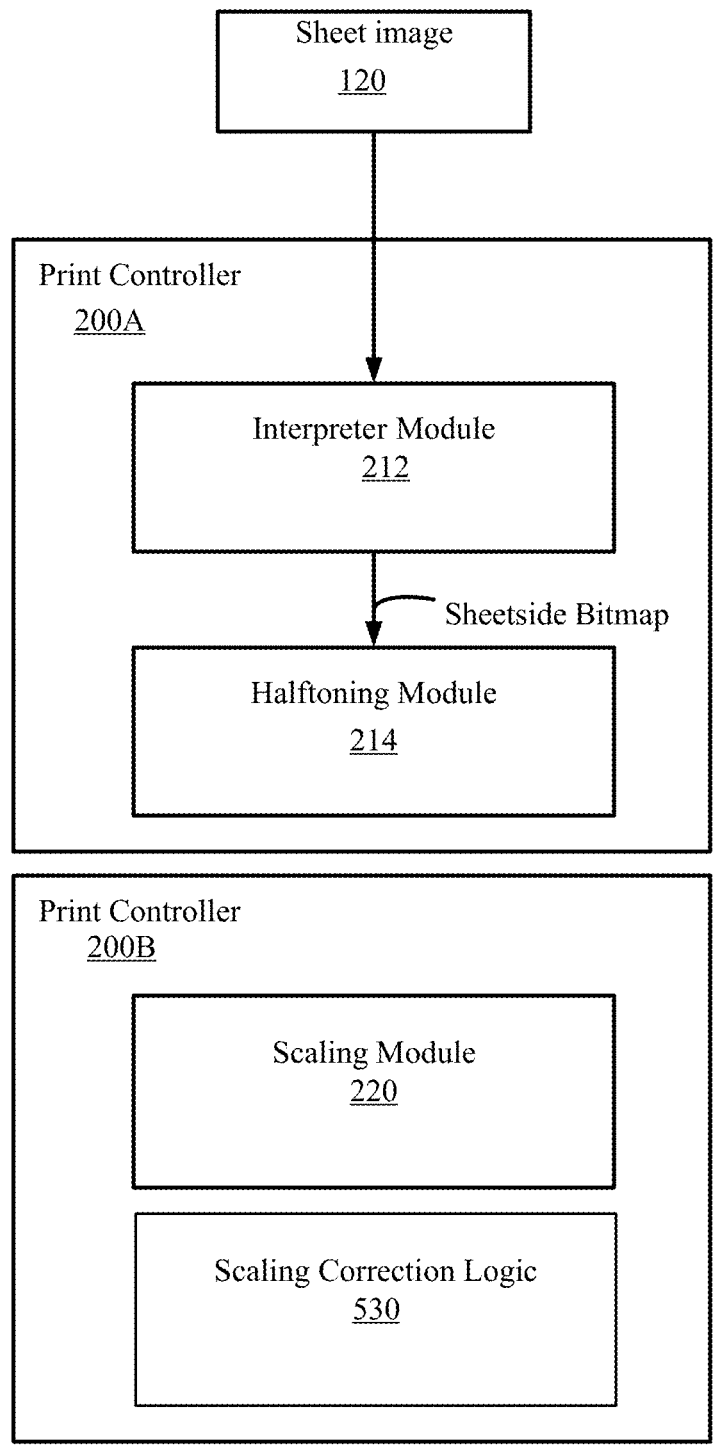

Although described above as being included within PVS 180 scaling correction logic 530, or one or more of its components, may be implemented at print controller 200. FIG. 2C illustrates an embodiment in which scaling correction logic 530 is included with print controller 200B with scaling module 220. In this embodiment, measurements generated at image captures devices 510 may be transmitted to print controller 200A, via interfaces 540 and 320, where scaling correction is performed.

Figure 8:
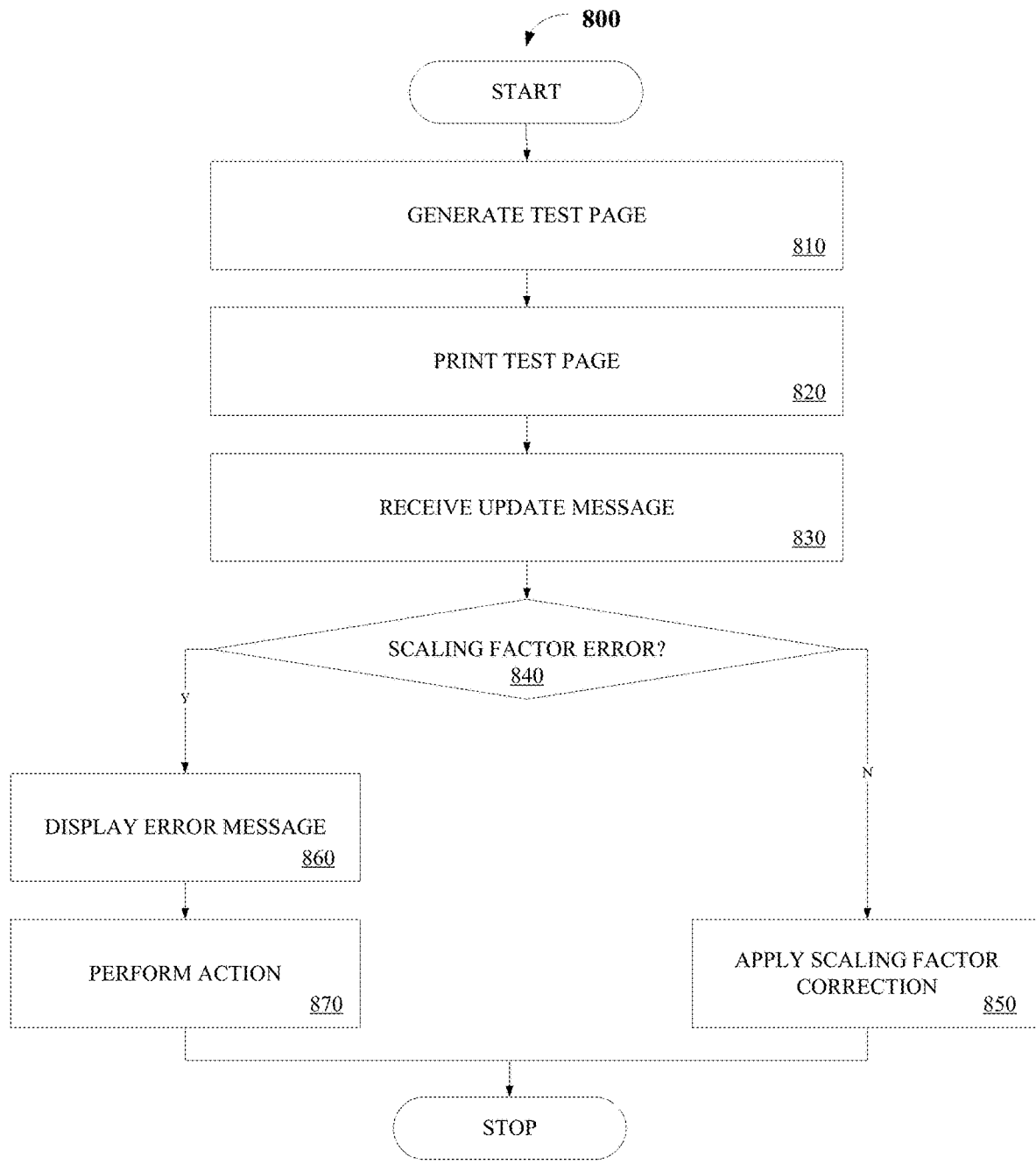
FIG. 8 is a flow diagram illustrating one embodiment of a process for scaling correction.

FIG. 8 is a flow diagram illustrating one embodiment of a scaling correction process 800 (e.g., performed at print controller 200). Process 800 may be performed by processing logic that may comprise hardware (e.g., circuitry, dedicated logic, programmable logic, etc.), software (such as instructions run on a processing device), or a combination thereof. The process 800 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-7 are not discussed or repeated here.

At processing block 810, a test page is generated including test marks to be printed on each printable side of the test page. Subsequently, the test page is inserted into print instructions. At processing block 820, the test page is printed. Sometime later, after scaling correction has been performed, an update message is received, processing block 830. At decision block 840, a determination is made as to whether the update message includes a scaling factor error message. If not, the update message includes a scaling factor correction (or updated scaling factor correction) that is applied to subsequent pages to be printed (e.g., by insertion of the scaling factor correction into the print instructions for the corresponding sides to be processed by print controller 200), processing block 850. The scaling factor correction is applied to one or more dimensions of the corresponding sides in the subsequent pages to be printed. However, an error message is displayed at GUI 350 upon a determination at decision block 840 that a scaling factor error message has been received, processing block 860. At processing block 870, a corrective action is performed (e.g., stop printing) if applicable.

Figure 9:
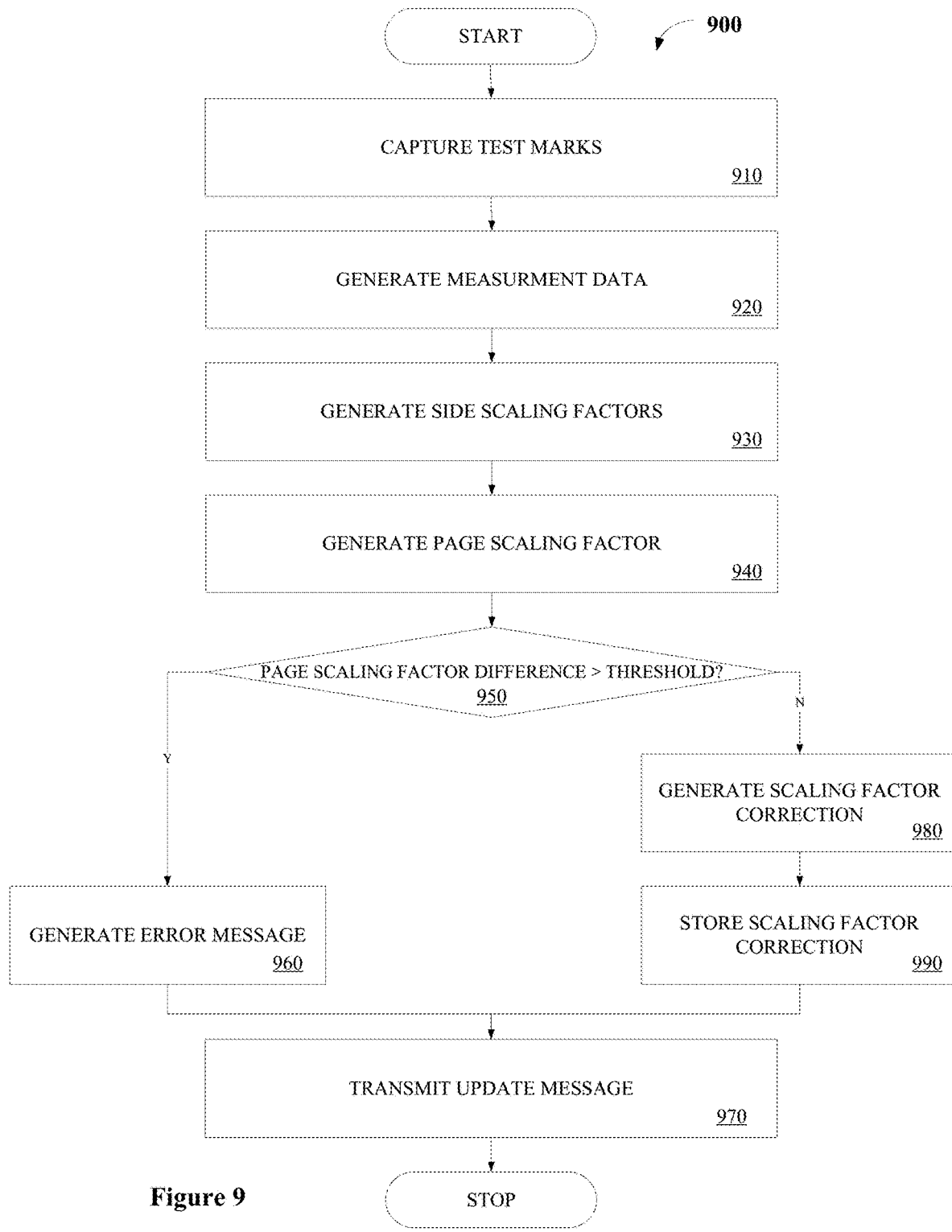
FIG. 9 is a flow diagram illustrating another embodiment of a scaling correction process.

FIG. 9 is a flow diagram illustrating one embodiment of a scaling correction process 900 (e.g., performed at PVS 180). Process 900 may be performed by processing logic that may comprise hardware (e.g., circuitry, dedicated logic, programmable logic, etc.), software (such as instructions run on a processing device), or a combination thereof. The process 900 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-8 are not discussed or repeated here.

At processing block 910, test marks on both sides of a test page are captured. At processing block 920, measurement data that includes test mark dimensions is generated for the captured test marks. At processing block 930, the side scaling factors are generated by comparing the dimensions based on measured print image data and dimensions based on expected print image data. As discussed above, the side scaling factor may be generated by averaging (e.g., via an affine transformation performed on an averaged measurement dimensions) two or more test marks.

At processing block 940, the page scaling factor is generated (e.g., a generated page scaling factor). At decision block 950, a determination is made as to whether a difference between the generated page scaling factor and a previous page scaling factor is greater than a predetermined threshold. If so, a scaling factor error message is generated, processing block 960. At processing block 970, the scaling factor error message is transmitted (e.g., to print controller 200).

Upon a determination at decision block 950 that the difference between the page scaling factor and a previous page scaling factor is not greater than the predetermined threshold, a scaling factor correction (or updated scaling factor correction) is generated, processing block 980. As discussed above, an updated scaling factor correction may comprise an averaging of two or more previously generated scaling factor corrections. At processing block 990, the scaling factor correction is stored (e.g., with associated print medium identifier), processing block 990, prior to be transmitted at processing block 970.

Figure 10:
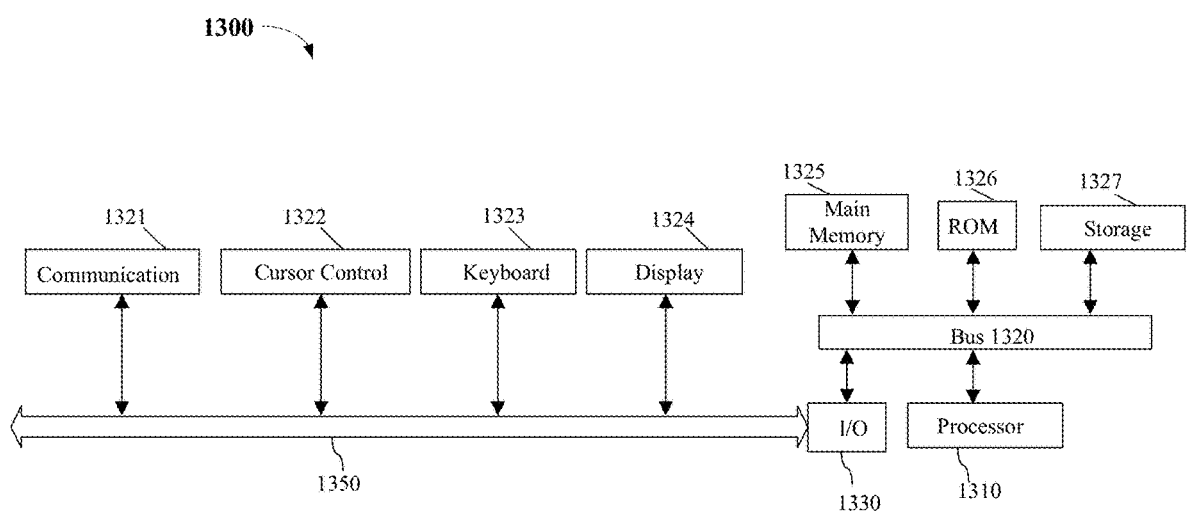
FIG. 10 illustrates one embodiment of a computer system.

FIG. 10 illustrates a computer system 1300 on which printers 110 and 120, printing system 100, print controller 200 and/or PVS 180 may be implemented. Computer system 1300 includes a system bus 1320 for communicating information, and a processor 1310 coupled to bus 1320 for processing information.

Computer system 1300 further comprises a random access memory (RAM) or other dynamic storage device 1327 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system that comprises at least one physical memory device to store scaling correction logic and one or more processors coupled with the at least one physical memory device to execute the scaling correction logic to receive first measured print image data associated with printed test marks on a first print medium from a first side of a first page image of a print job and second measured print image data associated with printed test marks on the first print medium from a second side of the first page image, generate a first side scaling factor based on the first measured print image data and a second side scaling factor based on the second measured print image data, generate a first page scaling factor including the first side scaling factor and the second side scaling factor and generate a scaling factor correction based on the page scaling factor.

Example 2 includes the subject matter of Example 1, wherein a side scaling factor is generated by comparing dimensions based on measured print image data and dimensions based on expected print image data.

Example 3 includes the subject matter of Examples 1 and 2, wherein the expected print image data is included in print instructions associated with the print job.

Example 4 includes the subject matter of Examples 1-3, wherein generating a side scaling factor comprises averaging measured dimensions of two or more of the test marks.

Example 5 includes the subject matter of Examples 1-4, wherein the side scaling factor comprises a first dimension scaling component and a second dimension scaling component.

Example 6 includes the subject matter of Examples 1-5, wherein generating a side scaling factor further comprises performing an affine transformation on the averaged measured dimensions.

Example 7 includes the subject matter of Examples 1-6, wherein the test marks are printed without applying the scaling factor correction.

Example 8 includes the subject matter of Examples 1-7, wherein the scaling correction logic further to store the scaling factor correction.

Example 9 includes the subject matter of Examples 1-8, wherein the scaling correction logic further to associate the scaling factor correction with a print medium identifier associated with the print medium and store the scaling factor correction.

Example 10 includes the subject matter of Examples 1-9, wherein the scaling correction logic further to receive a notification of a second print job to be printed on a second print medium, retrieve a second scaling factor correction based on a second print medium identifier and apply the second scaling factor correction to print instructions associated with the second print job.

Example 11 includes the subject matter of Examples 1-10, wherein the scaling correction logic further to receive third measured print image data associated with printed test marks on the print medium from a first side of a second page image of the print job and fourth measured print image data associated with printed test marks on the print medium from a second side of the second page image, generate a third side scaling factor based on the third measured print image data and a fourth side scaling factor based on the fourth measured print image data, generate a second page scaling factor based on the third side scaling factor and the fourth side scaling factor and generate an updated scaling factor correction based on the second page scaling factor.

Example 12 includes the subject matter of Examples 1-11, wherein the scaling correction logic further to generate an updated scaling factor correction based on an average of the first page scaling factor and the second page scaling factor.

Example 13 includes the subject matter of Examples 1-12, wherein the scaling correction logic further to determine whether a difference between the scaling factor correction and the updated scaling factor correction exceeds a predetermined threshold and generating an alert upon determining that the scaling factor correction and the updated scaling factor correction exceeds the predetermined threshold.

Example 14 includes the subject matter of Examples 1-13, further comprising one or more image capture devices to capture images of the print job.

Example 15 includes the subject matter of Examples 1-14, further comprising one or more printers to print the print job.

Some embodiments pertain to Example 16 that includes a method comprising receiving first measured print image data associated with printed test marks on a first print medium from a first side of a first page image of a print job and second measured print image data associated with printed test marks on the first print medium from a second side of the first page image, generating a first side scaling factor based on the first measured print image data and a second side scaling factor based on the second measured print image data, generating a first page scaling factor including the first side scaling factor and the second side scaling factor and generating a scaling factor correction based on the page scaling factor.

Example 17 includes the subject matter of Example 16, wherein a side scaling factor is generated by comparing dimensions based on measured print image data and dimensions based on expected print image data.

Example 18 includes the subject matter of Examples 16 and 17, wherein the expected print image data is included in print instructions associated with the print job.

Example 19 includes the subject matter of Examples 16-18, wherein generating a side scaling factor comprises averaging measured dimensions of two or more of the test marks.

Example 20 includes the subject matter of Examples 16-19, further comprising storing the scaling factor correction.

Some embodiments pertain to Example 21 that includes at least one computer readable medium having instructions stored thereon, which when executed by one or more processors, cause the processors to receive first measured print image data associated with printed test marks on a first print medium from a first side of a first page image of a print job and second measured print image data associated with printed test marks on the first print medium from a second side of the first page image, generate a first side scaling factor based on the first measured print image data and a second side scaling factor based on the second measured print image data, generate a first page scaling factor including the first side scaling factor and the second side scaling factor and generate a scaling factor correction based on the page scaling factor.

Example 22 includes the subject matter of Example 21, wherein a side scaling factor is generated by comparing dimensions based on measured print image data and dimensions based on expected print image data.

Example 23 includes the subject matter of Examples 21 and 22, wherein the expected print image data is included in print instructions associated with the print job.

Example 24 includes the subject matter of Examples 21-23, wherein generating a side scaling factor comprises averaging measured dimensions of two or more of the test marks.

Example 25 includes the subject matter of Examples 21-24, further comprising storing the scaling factor correction.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential.

What is claimed is:

1. A system comprising:
   at least one physical memory device to store scaling correction logic; and
   one or more processors coupled with the at least one physical memory device to execute the scaling correction logic to:
   receive first measured print image data associated with printed test marks on a first print medium from a first side of a first page image of a print job and second measured print image data associated with printed test marks on the first print medium from a second side of the first page image;
   generate a first side scaling factor based on the first measured print image data and a second side scaling factor based on the second measured print image data;
   generate a first page scaling factor including the first side scaling factor and the second side scaling factor; and
   generate a scaling factor correction based on the first page scaling factor.

2. The system of claim 1, wherein a side scaling factor is generated by comparing dimensions based on measured print image data and dimensions based on expected print image data.

3. The system of claim 2, wherein the expected print image data is included in print instructions associated with the print job.

4. The system of claim 2, wherein generating the side scaling factor comprises averaging measured dimensions of two or more of the test marks.

5. The system of claim 4, wherein the side scaling factor comprises a first dimension scaling component and a second dimension scaling component.

6. The system of claim 5, wherein generating the side scaling factor further comprises performing an affine transformation on the averaged measured dimensions.

7. The system of claim 1, wherein the test marks are printed without applying the scaling factor correction.

8. The system of claim 1, wherein the scaling correction logic further to store the scaling factor correction.

9. The system of claim 8, wherein the scaling correction logic further to:
   associate the scaling factor correction with a print medium identifier associated with the print medium; and
   store the scaling factor correction.

10. The system of claim 9, wherein the scaling correction logic further to:
    receive a notification of a second print job to be printed on a second print medium;
    retrieve a second scaling factor correction based on a second print medium identifier; and
    apply the second scaling factor correction to print instructions associated with the second print job.

11. The system of claim 1, wherein the scaling correction logic further to:
    receive third measured print image data associated with printed test marks on the print medium from a first side of a second page image of the print job and fourth measured print image data associated with printed test marks on the print medium from a second side of the second page image;
    generate a third side scaling factor based on the third measured print image data and a fourth side scaling factor based on the fourth measured print image data;
    generate a second page scaling factor based on the third side scaling factor and the fourth side scaling factor; and
    generate an updated scaling factor correction based on the second page scaling factor.

12. The system of claim 11, wherein the scaling correction logic further to generate an updated scaling factor correction based on an average of the first page scaling factor and the second page scaling factor.

13. The system of claim 11, wherein the scaling correction logic further to:
    determine whether a difference between the scaling factor correction and the updated scaling factor correction exceeds a predetermined threshold; and
    generating an alert upon determining that the scaling factor correction and the updated scaling factor correction exceeds the predetermined threshold.

14. The system of claim 1, further comprising one or more image capture devices to capture images of the print job.

15. The system of claim 1, further comprising one or more printers to print the print job.

16. A method comprising:
    receiving first measured print image data associated with printed test marks on a first print medium from a first side of a first page image of a print job and second measured print image data associated with printed test marks on the first print medium from a second side of the first page image;
    generating a first side scaling factor based on the first measured print image data and a second side scaling factor based on the second measured print image data;
    generating a first page scaling factor including the first side scaling factor and the second side scaling factor; and
    generating a scaling factor correction based on the first page scaling factor.

17. The method of claim 16, wherein a side scaling factor is generated by comparing dimensions based on measured print image data and dimensions based on expected print image data.

18. The method of claim 17, wherein the expected print image data is included in print instructions associated with the print job.

19. The method of claim 17, wherein generating the side scaling factor comprises averaging measured dimensions of two or more of the test marks.

20. The method of claim 16, further comprising storing the scaling factor correction.

21. At least one non-transitory computer readable medium having instructions stored thereon, which when executed by one or more processors, cause the processors to:

receive first measured print image data associated with printed test marks on a first print medium from a first side of a first page image of a print job and second measured print image data associated with printed test marks on the first print medium from a second side of the first page image;

generate a first side scaling factor based on the first measured print image data and a second side scaling factor based on the second measured print image data;

generate a first page scaling factor including the first side scaling factor and the second side scaling factor; and generate a scaling factor correction based on the first page scaling factor.

22. The computer readable medium of claim 21, wherein a side scaling factor is generated by comparing dimensions based on measured print image data and dimensions based on expected print image data.

23. The computer readable medium of claim 22, wherein the expected print image data is included in print instructions associated with the print job.

24. The computer readable medium of claim 22, wherein generating the side scaling factor comprises averaging measured dimensions of two or more of the test marks.

25. The computer readable medium of claim 21, having instructions stored thereon, which when executed by one or more processors, further cause the processors to store the scaling factor correction.

\* \* \* \* \*